Aug. 21, 1928.

U. J. HAYNES 1,681,665

EMERGENCY WHEEL FOR VEHICLES

Filed May 7, 1927     2 Sheets-Sheet 1

INVENTOR.
U. J. Haynes
BY
ATTORNEY.

Aug. 21, 1928.
U. J. HAYNES
1,681,665
EMERGENCY WHEEL FOR VEHICLES
Filed May 7, 1927  2 Sheets-Sheet 2
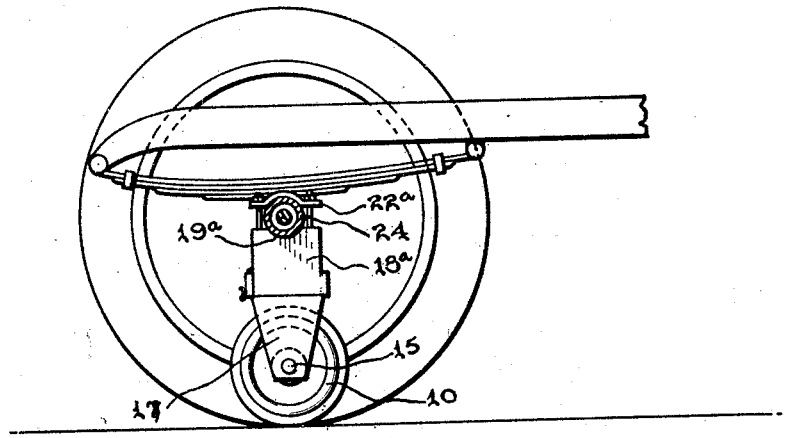
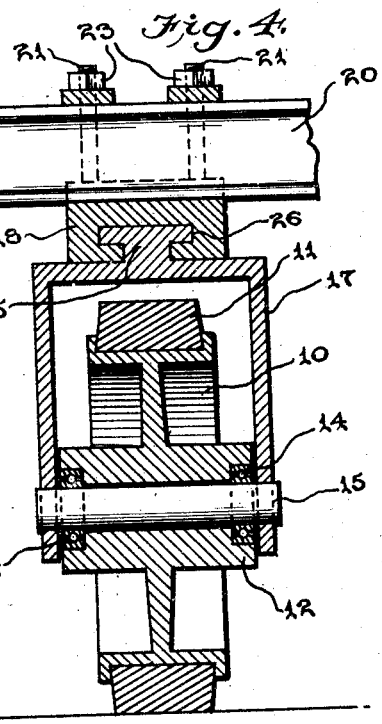
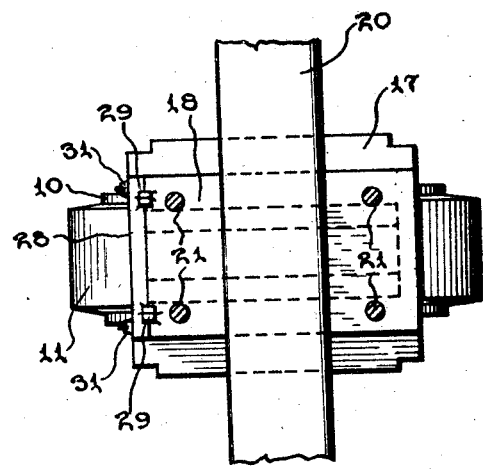
INVENTOR.
U. J. Haynes
BY
ATTORNEY.

Patented Aug. 21, 1928.

1,681,665

UNITED STATES PATENT OFFICE.

URLES JAMES HAYNES, OF PASCOLA, MISSOURI.

EMERGENCY WHEEL FOR VEHICLES.

Application filed May 7, 1927. Serial No. 189,627.

The object of the invention is to provide a device for use in connection with vehicles, particularly automobiles, whereby, should any damage occur to one or more of the wheels of the same, the device may be placed in position adjacent the damaged wheel and support the vehicle with the wheel clear of the ground until it shall have been towed or driven to an appropriate place for repair; to provide a device of the character mentioned which may be placed in operative position with a minimum effort on the part of the user; and to provide a device of extremely simple form so that it may be easily and cheaply manufactured and therefore marketed at a low cost.

With this object in view the invention consists in a construction and combination of parts of which a preferred embodiment is illustrated in the accompanying drawings, wherein.

Figure 3:
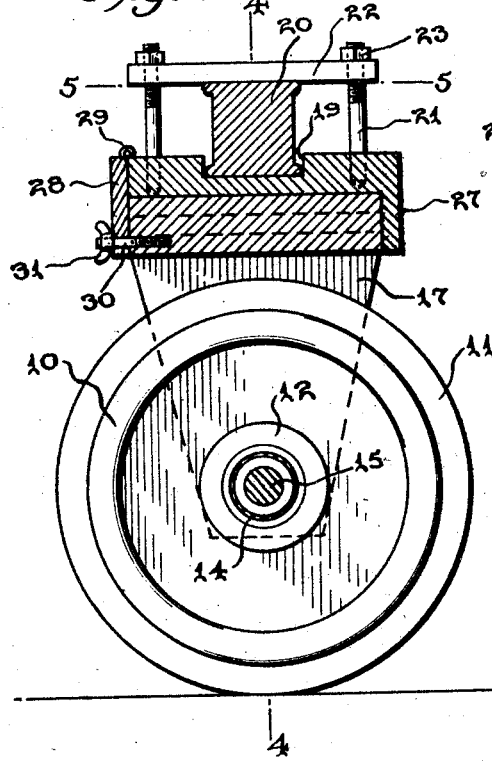
Figure 3 is a vertical sectional view on the plane indicated by the line 3—3 of Figure 2.
Figure 2:
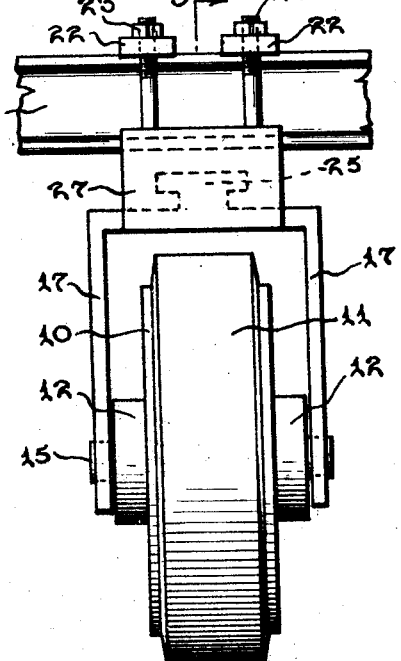
Figure 2 is an enlarged detailed edge elevational view of the invention.

Figures 4 and 5 are respectively sectional views on the planes indicated by the lines 4—4 and 5—5 of Figure 3.

Figure 1:
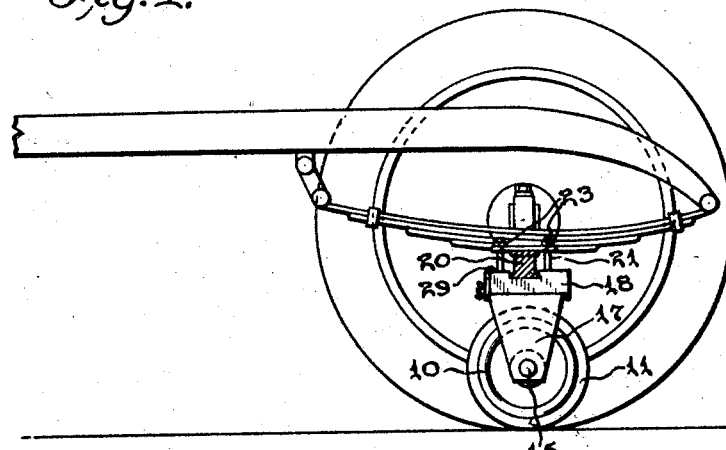
Figure 1 is a side elevational view of a portion of an auto vehicle chassis and axle (the latter being broken away) showing the invention applied in operative position.

Figure 6 is a view similar to Figure 1 showing the invention applied under the rear axle of the vehicle.

The emergency wheel or roller 10 is of relatively small diameter as compared with the diameter of the usual vehicle or automobile wheel, being peripherally bounded by preferably a solid tire 11 and having a hub 12 fitted with ball bearings 14 rotatably mounted on a spindle or shaft 15 spanning the arms of a pendent hanger 17.

The hanger 17 is formed to provide a detachable interlocking connection with the axle block 18, the latter being formed with a seat 19 in which the axle 20 is engaged, the block being provided on either side of the seat with upstanding studs 21 extending above the plane of the upper face of the axle which is spanned by the clamp bars 22, the latter being formed with eyes through which the studs 21 pass and the latter receiving the nuts 23 bearing against them. The studs and the clamping bars thus serve as a means for holding the axle block in place and in the use of the invention it is preferable that both the forward axle 20 and the rear axle 24 be permanently equipped with them, one adjacent each wheel. The rear axle block 18$^a$ is modified to some extent over the front axle block 18 by being made of greater depth and having the seat 19$^a$ formed to a circular contour to accommodate the rear axle, the clamping bars 22$^a$ being of arched form as shown to effect uniform contact with the top of the axle in their connection with the same.

The interlocking connection between the hanger 17 and the axle block consists of a cross-sectionally T-shaped rib 25 formed as an integral part of the web portion of the hanger and slidingly engaging in a correspondingly shaped slot 26 formed in the under face of the axle block. The slot 26 at the rear end of the axle block is closed by the end wall 27 of the same and the remote end of the axle block is provided with a plate 28 hingedly connected with the block as at 29 so as to swing into and out of obstructing relation with the slot, so as to permit the disengagement of the rib from the slot when raised, or to retain the rib in such engagement when closed, the closed position being maintained by means of studs 30 secured in the axle block as by being threaded into the latter and passing through openings in the plate 28 and receiving wing nuts 31 bearing upon the plate.

With the axle blocks mounted adjacent each wheel of the vehicle with which the invention is used, should damage occur to any wheel, as by breakage of any part or the puncture of a tire, the damaged or injured wheel may be jacked up and the emergency wheel or roller placed in position, the operation consisting of releasing the plate 28 to expose the open end of the slot 26, when the hanger may be engaged with the axle block by sliding the T-shaped rib of the former into the correspondingly shaped slot of the latter. The plate 28 is then swung to closed position and the wing nuts 31 attached, when the vehicle is supported in the region of the damaged wheel and may be readily moved by reason of the fact that such support embodies the wheel or roller 10.

The invention having been described, what is claimed as new and useful is:

An emergency device for the purpose indicated comprising an axle block, a roller, and a hanger in which the roller is rotatably mounted, said hanger having an interlocking detachable connection with the axle block consisting of a transversely T-shaped rib on the former engaging a correspondingly shaped slot in the latter, the axle block having a wall closing said slot at one end and a swinging plate releasingly closing the slot at the other end.

In testimony whereof he affixes his signature.

URLES JAMES HAYNES.